(12) United States Patent
Nashed et al.

(10) Patent No.: US 11,112,259 B2
(45) Date of Patent: Sep. 7, 2021

(54) LOCALIZATION DETERMINATION FOR VEHICLE OPERATION

(71) Applicants: Nissan North America, Inc., Franklin, TN (US); Renault S.A.S., Boulogne-Billancourt (FR)

(72) Inventors: Samer Nashed, Amherst, MA (US); David Ilstrup, Santa Cruz, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/758,538

(22) PCT Filed: Oct. 24, 2017

(86) PCT No.: PCT/US2017/058081
§ 371 (c)(1),
(2) Date: Apr. 23, 2020

(87) PCT Pub. No.: WO2019/083513
PCT Pub. Date: May 2, 2019

(65) Prior Publication Data
US 2020/0249038 A1  Aug. 6, 2020

(51) Int. Cl.
*G01C 21/34* (2006.01)
*H04W 4/029* (2018.01)
(Continued)

(52) U.S. Cl.
CPC ..... *G01C 21/3461* (2013.01); *G01C 21/3492* (2013.01); *G06K 9/00798* (2013.01); *G06K 9/6297* (2013.01); *H04W 4/029* (2018.02)

(58) Field of Classification Search
USPC .......................................................... 701/533
See application file for complete search history.

(56) References Cited

U.S. PATENT DOCUMENTS

2014/0297562 A1* 10/2014 Beale ................ G06Q 40/06
                                                         705/36 R
2015/0088466 A1*  3/2015 Zhang .............. G06T 17/05
                                                         703/1
(Continued)

FOREIGN PATENT DOCUMENTS

CN    103185578 A    7/2013
CN    104508719 A    4/2015

OTHER PUBLICATIONS

Sergui Nedevschi et al: "Accurate Ego-Vehicle Global Localization at Intersections Through Alignment of Visual Data With Digital Map", IEEE Transactions on Intelligent Transportation Systems, IEEE, Piscataway, NJ, USA, vol. 14, No. 2, Jun. 1, 2013 (Jun. 1, 2013), pp. 673-687.

(Continued)

*Primary Examiner* — Peter D Nolan
*Assistant Examiner* — Luke Huynh
(74) *Attorney, Agent, or Firm* — Young Basile Hanlon & MacFarlane, P.C.

(57) ABSTRACT

Traversing a vehicle transportation network, by a vehicle, may include determining vehicle operational information, determining a metric location estimate for the vehicle using the vehicle operational information, determining operational environment information of a portion of the vehicle transportation network, determining a topological location estimate for the vehicle within the vehicle transportation network using the metric location estimate and the operational environment information, and traversing the vehicle transportation network based on the topological location estimate for the vehicle. The operational environment information can include sensor data of a portion of the vehicle transportation network that is observable to the vehicle. To determine the metric location estimate, a non-linear loss function with a Kalman filter may mitigate effects of un-modeled sensor error(s). Techniques using Hidden Markov Models (Continued)

and the Earth Mover's Distance to determine the topological location estimate are also described.

20 Claims, 9 Drawing Sheets

(51) Int. Cl.
    *G06K 9/00*     (2006.01)
    *G06K 9/62*     (2006.01)

(56) References Cited

U.S. PATENT DOCUMENTS

2016/0245949 A1*   8/2016   Preston .................... B60Q 9/00
2017/0089723 A1     3/2017   Heide et al.
2017/0248960 A1*   8/2017   Shashua ............. G01C 21/3658

* cited by examiner

LOCALIZATION DETERMINATION FOR VEHICLE OPERATION

CROSS-REFERENCE TO RELATED APPLICATION

This application is a 371 national stage of International Application Serial No. PCT/US2017/058081, filed Oct. 24, 2017, the entire disclosure of which is hereby incorporated by reference.

TECHNICAL FIELD

This disclosure relates to vehicle operational management and driving, including autonomous vehicle operational management and autonomous driving.

BACKGROUND

A vehicle, such as an autonomous vehicle, can traverse a portion of a vehicle transportation network. Traversing the vehicle transportation network includes generating or capturing, such as by a sensor of the vehicle, data representing an operational state of the vehicle. This data may be used for localization of the vehicle within the vehicle transportation network.

SUMMARY

Disclosed herein are aspects, features, elements, implementations, and embodiments of localization for vehicle operation using metric and topological location information. Herein, a metric location refers to a physical location, typically in a global coordinate system, while a topological location refers to a corresponding virtual location within a topological map that shows at least a portion of a vehicle transportation network, typically in the coordinate system of the map. Reference to a location without a modifier may refer to either or both of a metric location and a topological location depending upon context.

An aspect of the disclosed embodiments is a method of traversing a vehicle transportation network, which includes determining vehicle operational information of a vehicle, determining a metric location estimate of the vehicle using the vehicle operational information, determining operational environment information of a portion of the vehicle transportation network, determining a topological location estimate of the vehicle within the vehicle transportation network using the metric location estimate and the operational environment information, and traversing, by the vehicle, the vehicle transportation network based on the topological location estimate of the vehicle. The operational environment information includes sensor data of a portion of the vehicle transportation network that is observable to the vehicle. The portion observable to the vehicle may be co-extensive with, or different from, one or more sensor ranges of sensor(s) providing the operational environment information to the vehicle. The sensor data can include remote vehicle location data.

Another aspect of the disclosed embodiments is a vehicle, which may be an autonomous vehicle that includes a processor configured to execute instructions stored on a non-transitory computer readable medium to determine vehicle operational information of the vehicle, determine a metric location estimate of the vehicle using the vehicle operational information, determine operational environment information of a portion of the vehicle transportation network, the operational environment information including sensor data of a portion of the vehicle transportation network that is observable to the vehicle, and the sensor data comprising remote vehicle location data, determine a topological location estimate of the vehicle within the vehicle transportation network using the metric location estimate and the operational environment information, and traversing, by the vehicle, the vehicle transportation network based on the topological location estimate of the vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

DETAILED DESCRIPTION

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data for use in traversing the vehicle transportation network. Sensor data may include vehicle operational information, such as global positioning system (GPS) coordinates, whether the vehicle is moving or in a fixed position, a vehicle heading, etc. Sensor data may also include information corresponding to the operational environment of the vehicle, such as information corresponding to one or more external objects, such as pedestrians, remote vehicles, other objects within the vehicle operational environment, vehicle transportation network geometry or topology, or a combination thereof. This information may be referred to herein as operational environment information.

For control of the vehicle, localization of the vehicle may use metric (e.g., observed or measured) location, such as latitude, longitude, and heading, to inform the topological location within the vehicle transportation network, such as the left-most lane of a particular street or road. That is, the metric location may be determined using sensor data. The determination of the topological location relies upon an accurate topological map and an accurate metric location, which is converted into coordinates within the coordinate system of the topological map.

Accurate metric and topological location estimates contribute to safe, effective navigation and decision making. An accurate determination of the metric location may be performed using relatively expensive sensors that provide precise global information. Lower quality sensor information and sensor information that has a limited scope can reduce the accuracy of the metric location estimate, and hence of the topological location estimate. For example, a reduced accuracy sensor may indicate two different sets of coordinates for the same physical location. The estimates can also suffer when a sensor of the vehicle produces erroneous data, or fails in its entirety.

Even where the metric location is accurate, the topological location estimate may be less accurate than is desired. For example, although many high-definition (HD) topological maps exist, the maps may have errors resulting from construction, traffic accidents, natural events such as landslides, etc., that cause the true topology of roads within the vehicle transportation network to differ from the topology given by the map. Lower quality maps can compound these errors, making it difficult to, for example, accurately identify a specific lane of a road in which the vehicle is traveling.

Techniques described herein address uncertainty, ambiguity, and/or native errors within sensors of the vehicle, the topological map available to the vehicle, or both.

Figure 1:
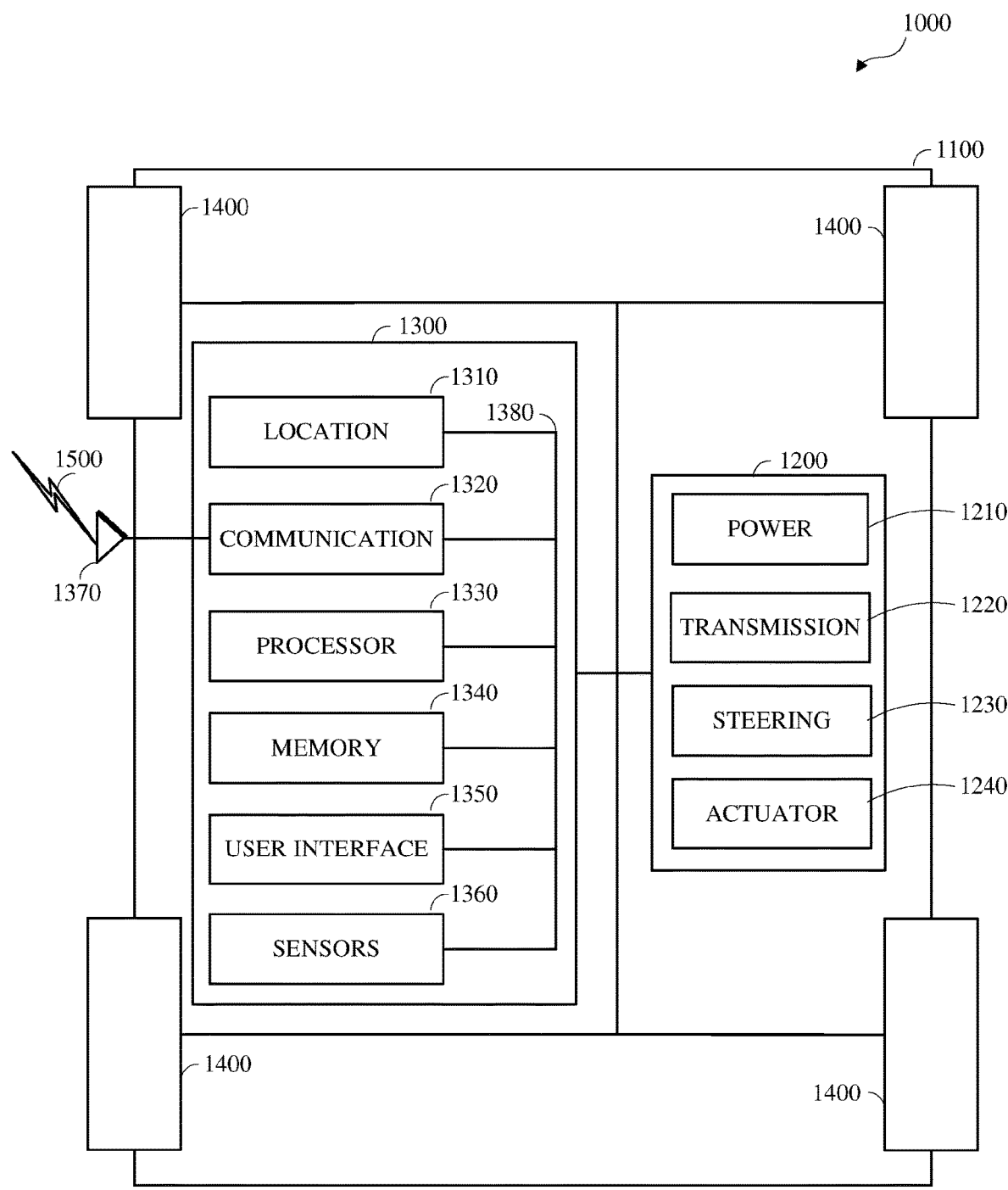
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. In the embodiment shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. The steering unit 1230 may be controlled by the controller 1300, the actuator 1240, or both and controls the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that are operable to report information regarding some aspect of the current dynamic situation of the vehicle 1000.

The sensors 1360 include one or more sensors that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
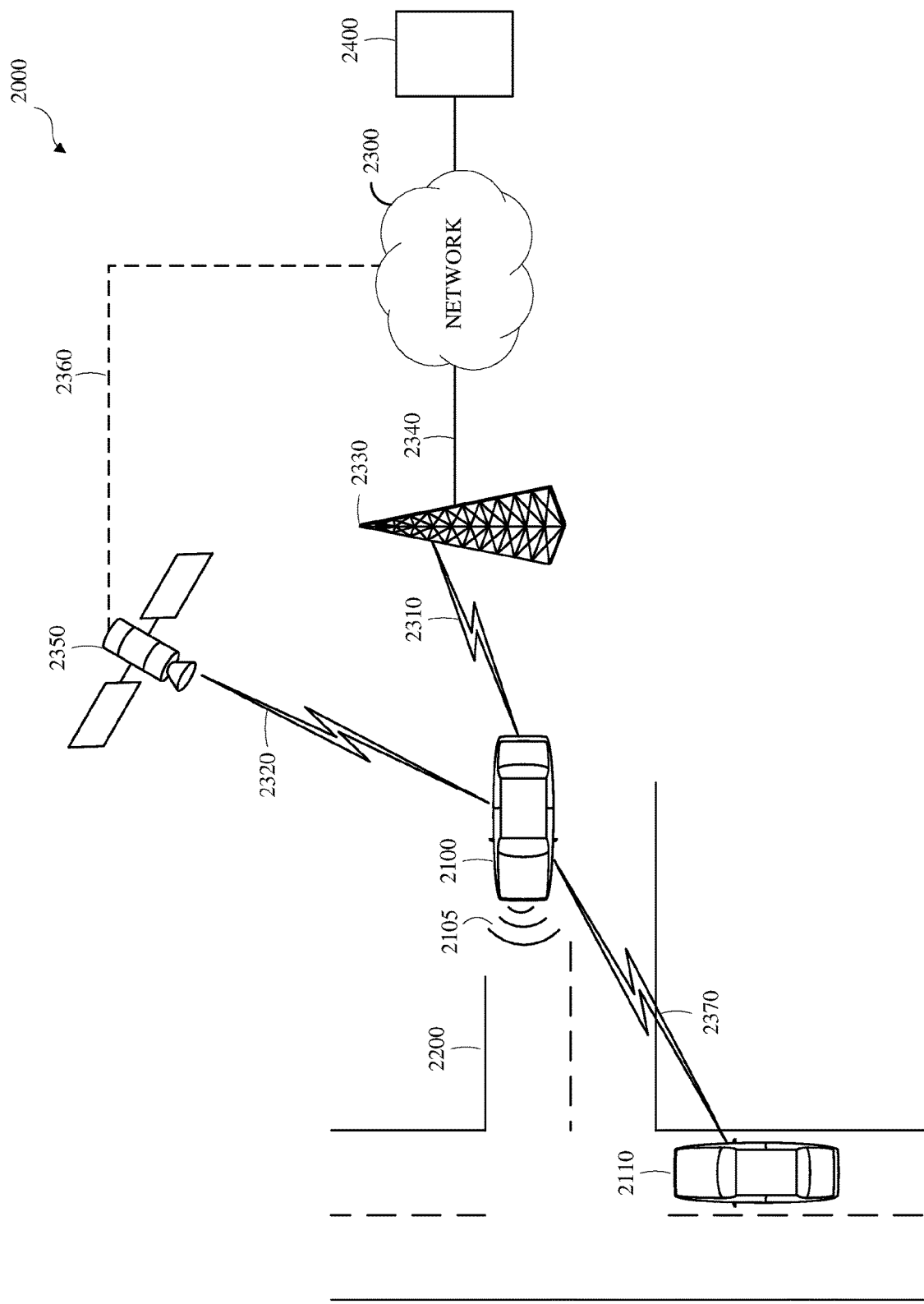
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensors 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
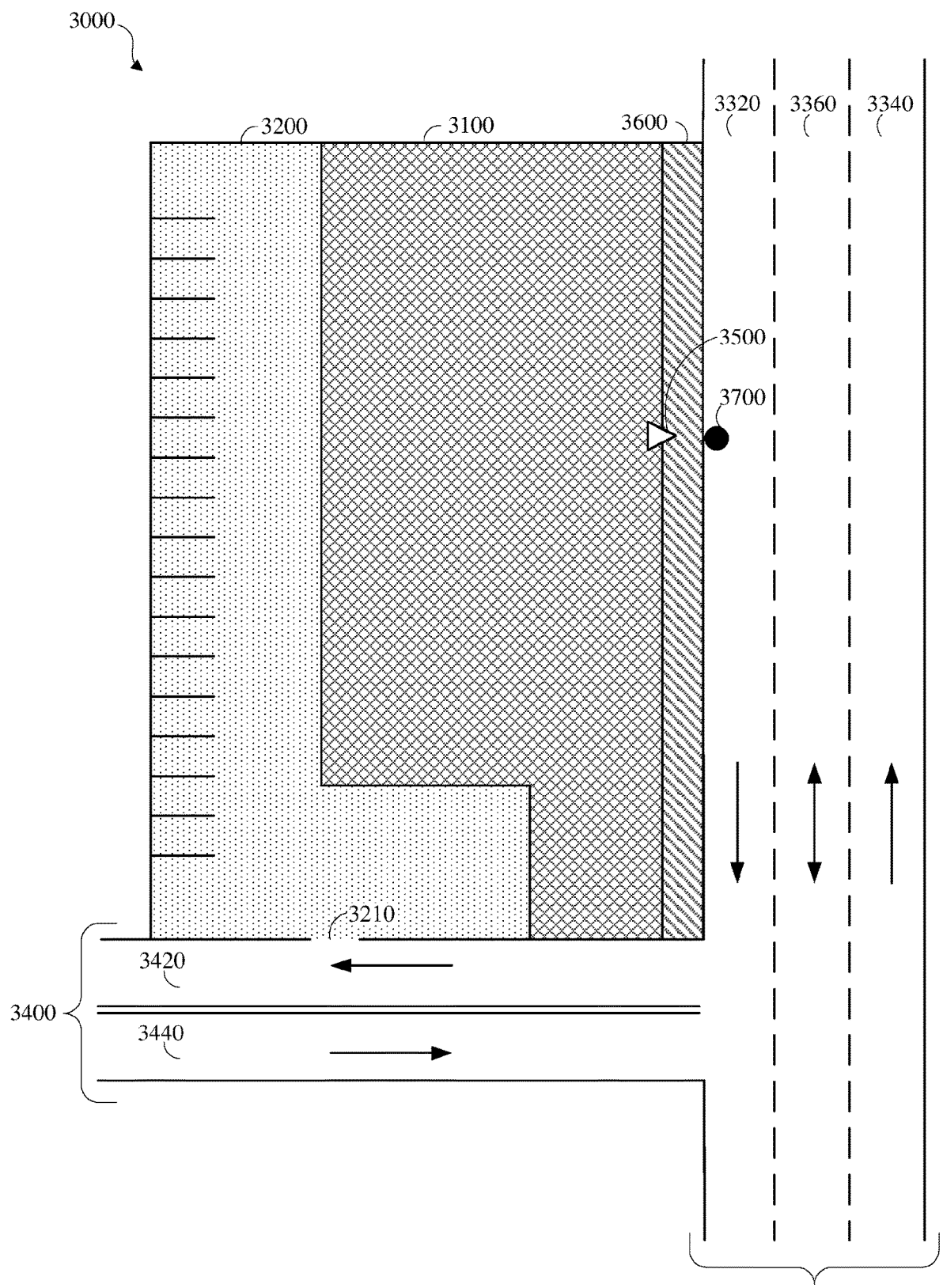
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 300 shown in FIG. 3 includes an interchange 3210 between the parking area 3200 and road 3400. A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3.

A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed. The vehicle transportation network information may include docking location information, such as information identifying a geolocation of the docking location 3700. Although not shown separately in FIG. 3, docking location information may identify a type of docking operation associated with a docking location 3700. For example, a destination may be associated with a first docking location for passenger loading and a second docking location for passenger unloading.

Figure 4:
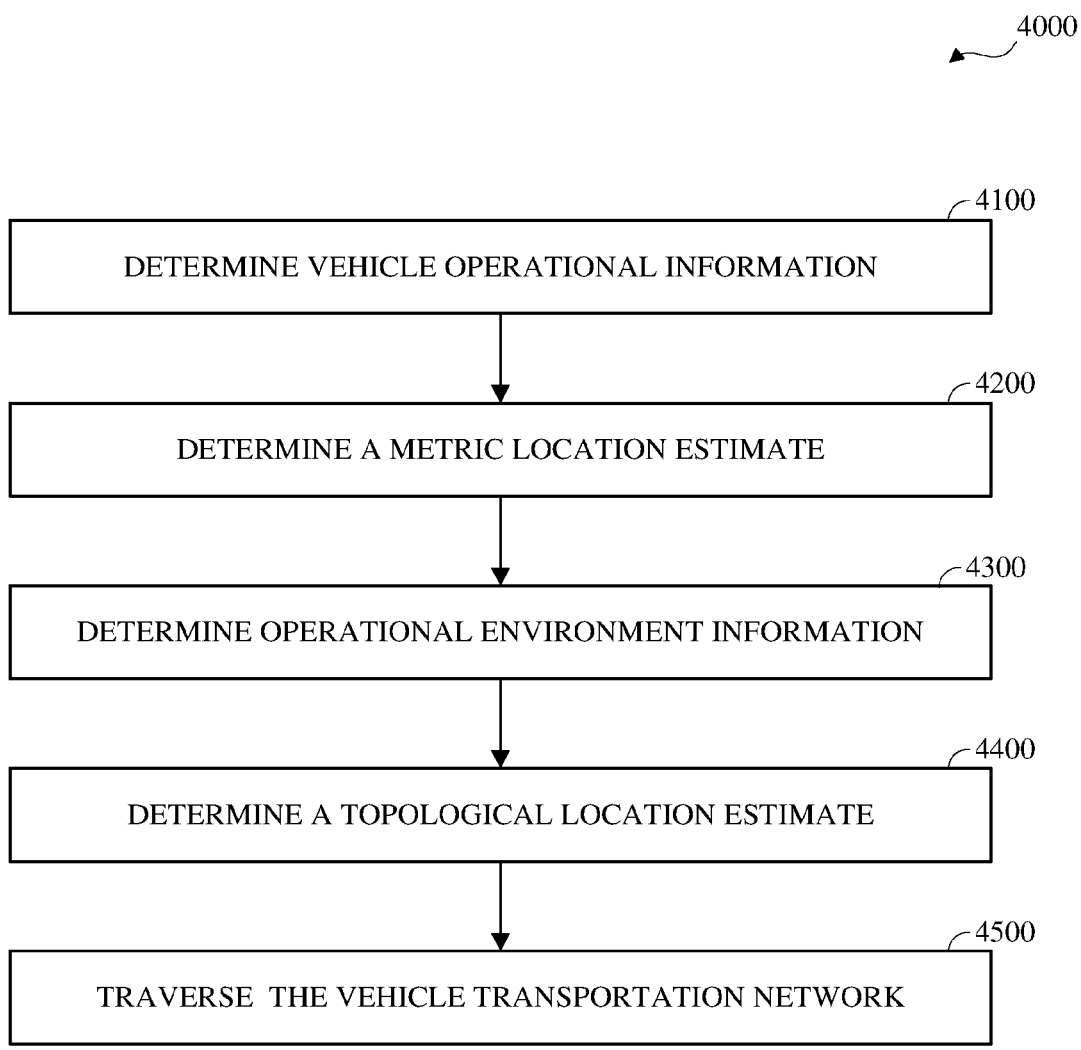
FIG. 4 is a flow diagram of an example of traversing a vehicle transportation network using a localization determination in accordance with embodiments of this disclosure.

FIG. 4 is a flow diagram of an example of traversing a vehicle transportation network using a localization determination in accordance with embodiments of this disclosure. The process of FIG. 4 may be implemented in a vehicle, such as the vehicle 1000 shown in FIG. 1, one of the vehicles 2100/2110 shown in FIG. 2, an autonomous vehicle, a semi-autonomous vehicle, or any other vehicle. The process of FIG. 4 may be implemented at least in part in another part of the vehicle transportation and communication system 2000, such as the communication device 2400, with instructions for traversing the vehicle transportation network transmitted to a vehicle via the network 2300. In either case, the process may be performed by a processor executing instructions stored in a non-transitory storage medium or memory.

At operation 4100, the process includes determining vehicle operational information. Determining the vehicle operational information may include reading sensor data from sensors of the vehicle, such as the sensors 1360 described in FIG. 1. Determining the vehicle operational information may include receiving sensor data from sensors of the vehicle or from sensors of other vehicles that observe the vehicle. The vehicle operational information may include a location of the vehicle in global coordinates. In an example, the location is indicated by a longitude and a latitude that is measured by a sensor. The vehicle operational information may include a heading of the vehicle that is measured by a sensor or is calculated from multiple sensor values. Other vehicle operational information, such as the speed of the vehicle, may be used. The vehicle operational information may be determined for multiple temporal points while the vehicle is traversing the vehicle transportation network. For example, the multiple temporal points occur every 100 ms, or some other time interval.

At operation 4200, the process includes determining a metric location estimate of the vehicle using the vehicle operational information. Determining the metric location estimate may be performed by extracting the location data from the vehicle operational information. The location data itself can be used for the metric location estimate. However, this does not address statistical noise and other inaccuracies in individual estimates. A Kalman filter may be incorporated that uses the vehicle operational information determined for the multiple temporal points at operation 4100 to reduce the effects of these errors on the final metric location estimate for a given temporal point.

The Kalman filter is effective with relatively small and with modeled errors, but sensor errors are often difficult to model. This is particularly true for GPS sensors. Further, sensor errors can be relatively large as compared to, e.g., statistical noise. According to some embodiments described herein, improvements in mitigating the effects of relatively large, un-modeled errors in the determination of a metric location may be achieved by using a non-linear loss function with a Kalman filter. In this example, determining a location estimate for respective temporal points of the multiple temporal points, determining a projected location estimate for respective, subsequent temporal points, and determining the metric location estimate of a current temporal point using a non-linear loss function with a Kalman filter to mitigate effects of un-modeled sensor error.

The non-linear loss function may be based on a comparison of the location estimate with the projected location estimate for a same temporal point. For example, differences between the locations at the same temporal point may be minimized. The non-linear loss function may be continuously refined (e.g., re-optimized for minimization) at each temporal point. In such implementations, the location estimate determined for a respective temporal point may be determined using the non-linear loss function before the non-linear loss function is refined based on the comparison of the current location estimate with the projected location estimate from the previous temporal point.

Determining the metric location estimate of the temporal point using the non-linear loss function with a Kalman filter can include providing the metric point represented by the latitude and the longitude of the vehicle sensed at the temporal point as input to the non-linear loss function, where the non-linear loss function selectively weights (e.g., penalizes) the metric point for use in the Kalman filter.

Figure 5:
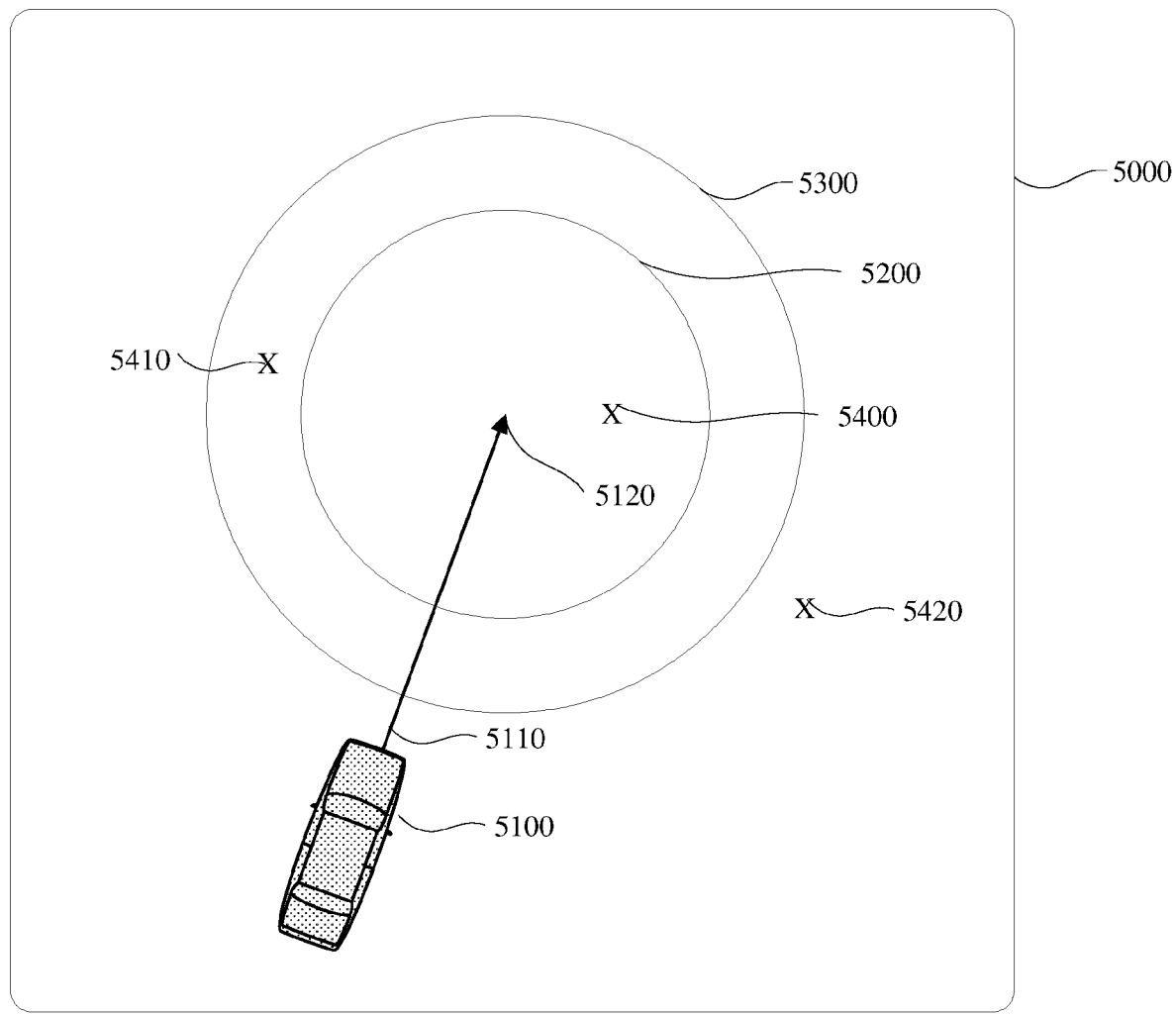
FIG. 5 is a diagram of an example of implementing a non-linear loss function for localization determination in accordance with embodiments of this disclosure.

FIG. 5 is a diagram of an example of implementing a non-linear loss function for localization determination in accordance with embodiments of this disclosure. The non-linear loss function can be a user-defined function that maps the values for the sensor data used in the Kalman filter to a respective weighting to be applied to a value (e.g., the location estimate) in the determination of the metric location estimate. In the example of FIG. 5, the vehicle 5100 is traversing a portion 5000 of the vehicle transportation network over time at a heading indicated by the arrow 5110. The vehicle 5100 is shown at the metric location estimate of the temporal point before the current temporal point. The temporal point before the current temporal point may be referred to as a first temporal point, while the current temporal point may be referred to as a second temporal point to reflect that the current temporal point is subsequent to the first temporal point. The projected location estimate of the current temporal point may be determined using a heading of the vehicle measured at or calculated from values measured at the first temporal point. Because the next temporal point is known from a defined sampling interval, the speed of the vehicle (e.g., determined at the first temporal point at part of the vehicle operational information) may be used with the heading to calculate the projected location estimate 5120 of the vehicle 5100.

The non-linear loss function in FIG. 5 comprises multiple radii defining concentric circles 5200, 5300 about the projected location estimate 5120 at the current temporal point. As mentioned, weighting may be applied to a metric point or location of the vehicle represented by the determined latitude and longitude values. The weighting may be based on the difference between the projected location estimate 5120 and the metric point. One factor that may result in a difference between the projected location estimate 5120 and the metric point is the accuracy of the source of the determined latitude and longitude values. In FIG. 5, three possible GPS readings 5400, 5410, and 5420 are shown. The GPS readings 5400, 5410, and 5420 are the respective location estimates for the current temporal point in this example, but it is possible for a location estimate to be determined using additional vehicle operational information.

In the example of FIG. 5, the non-linear loss function provides sensed values of the longitude and the latitude at the current temporal point (i.e., the GPS reading 5400) to the Kalman filter, for determining the metric location estimate of the current temporal point, responsive to the location estimate for the current temporal point being located within a first circle having a smallest radius of the multiple radii, here the circle 5200. In other words, the sensed values are not penalized (i.e., they are weighted at 100%) because they are relatively close to the expected location for the vehicle. Relatively close means that the sensed values are within a first threshold distance of the expected location (i.e., the projected location estimate 5120). The non-linear loss function omits the sensed values from the Kalman filter, for determining the metric location estimate of the current temporal point, responsive to the location estimate for the current temporal point (i.e., the GPS reading 5420) being located outside of a second circle having a largest radius of the multiple radii, here the circle 5300. In other words, the sensed values are ignored (i.e., they are weighted at 0%) because they are relatively far from the expected location for the vehicle. Relatively far means that the sensed values are outside of a second threshold distance of the expected location (i.e., the projected location estimate 5120).

The non-linear loss function may apply a penalty to the sensed values (i.e., the GPS reading 5410) to obtain penalized sensed values, and provide the penalized sensed values to the Kalman filter, for determining the location estimate of the current temporal point, responsive to the metric location estimate for the current temporal point being located outside of the first circle (i.e., the circle 5200) and inside of the second circle (i.e., the circle 5300). In other words, the sensed values are penalized at some value between 0% and 100%, exclusive, when they are located outside of the first threshold distance but within the second threshold distance from the expected location for the vehicle.

While FIG. 5 shows only two concentric circles 5200, 5300, more than two radii (or radiuses) may be used, with different penalty values that increase with distance from the projected location estimate 5120.

The non-linear loss function may be a context-based function. That is, the parameters of the non-linear loss function would vary based on the context of the vehicle. The parameters may include the radii of the concentric circles. The parameters may include the number of radii, and hence the number of concentric circles. The parameters may define different shapes for implementing the non-linear loss function based on the context. Accordingly, the parameters may include the first threshold distance, the second threshold distance, and any other threshold distance for the shape. The parameters may include the penalty applied to measured values. The context of the vehicle may be based on the vehicle operational information, such as the speed, whether the vehicle is turning, whether the vehicle is going down or up a hill, etc. The context of the vehicle may be based on the operational environment information, such as the level of traffic congestion, whether the vehicle is traveling in a city environment or a country environment, the type of road on which the vehicle is traveling, etc.

Determining the metric location estimate of the temporal point using the non-linear loss function with a Kalman filter is described herein providing the sensed vehicle operational information (e.g., the latitude and longitude) as input to the non-linear loss function, where the non-linear loss function selectively weights (or penalizes) the values for use in the Kalman filter. In some implementations, the design of the non-linear loss function and the Kalman filter may be such that the non-linear loss function provides the penalty to the Kalman filter with the values for the determination of the metric location estimate. While the non-linear loss function and the Kalman filter are described as using sensed or measured values in the coordinate system of the physical system in which the vehicle operates, some or all of the calculations may use location estimates generated by converting the sensed or measured values to the coordinate system of the topological map.

Determining the metric location estimate of the temporal point using a non-linear loss function with a Kalman filter as described herein can identify when sensors become unreliable. For example, an unreliable GPS sensor may be identified where the weighting varies over the multiple temporal points while the vehicle is traversing the vehicle transportation system. Determining the metric location estimate of the temporal point using a non-linear loss function with a Kalman filter as described herein can determine which sensors to use given the quality of those sensors. Determining the metric location estimate of the temporal point using the non-linear loss function with a Kalman filter as described herein can determine which algorithms to use in the calculations with the given sensors. For example, different sensors may be available to provide inputs to the non-linear loss function and Kalman filter that can be used to separately or in combination generate the metric location estimate. By separately determining the metric location estimate according to the teachings herein using the different sensors, or different combinations of the sensors, the number of occasions the non-linear loss function penalizes the sensed data and/or the amount of penalization (e.g., cumulative or per occasion) may be used to determine which sensors have the lowest quality, and hence should not be used, or which algorithms may be used in the failure of a sensor.

Determining the metric location estimate of the temporal point using a non-linear loss function with a Kalman filter as described herein reduces the need for expensive sensors by increasing robustness to erroneous data. The solution is easy to implement, and adds very little computational complexity to using the Kalman filter alone. Moreover, the non-linear loss function can be easily learned or modified depending on context. For at least these reasons, and returning to FIG. 4, the metric location estimate determined using a non-linear loss function with a Kalman filter at operation 4200 may be used directly at operation 4400 to determine a topological location estimate of the vehicle within the vehicle transportation network. That is, determining operational environment information at operation 4300 may be omitted, and the operational environment information is not used in determining the topological location estimate of the vehicle at operation 4400. Determining the topological location estimate at operation 4400 may include converting coordinates of the metric location estimate to the coordinate system of the topological map including the vehicle transportation network. The topological location estimate may be associated with a particular road. The topological location estimate may be associated with a particular lane of a particular multi-lane road.

The vehicle transportation network is traversed based on the topological location estimate of the vehicle at operation 4500. Traversing the portion of the vehicle transportation network based on the topological location estimate of the vehicle may include providing navigation instructions to the vehicle. Traversing the vehicle transportation network based on the topological location estimate of the vehicle may include using the topological location estimate as an input to a control system for the vehicle. For example, wherein the vehicle is an autonomous vehicle, traversing the portion of the vehicle transportation network based on the topological location estimate of the vehicle may include controlling the vehicle to perform a lane change, turning a corner, or some other vehicle operation.

While determining the metric location estimate using a non-linear loss function with a Kalman filter at operation 4200 provides benefits in the localization determination of the vehicle, additional benefits may be achieved by combining the use of a non-linear loss function and a Kalman filter with one or more of the different techniques used for determining a topological location estimate using operational environment information as discussed in more detail below. Further, the different techniques for determining a topological location estimate using operational environment information as discussed in more detail below may be used together or separately regardless of how the metric location estimate is determined at operation 4200. Thus, determining the metric location estimate of the vehicle at operation 4200 may be performed as discussed initially. That is the metric location estimate may be performed by extracting the location data from the vehicle operational information and using the location data itself as the metric location estimate. More desirably, a Kalman filter is incorporated that uses the vehicle operational information determined for the multiple temporal points at operation 4100 to reduce the effects of statistical noise and other inaccuracies in individual estimates so as to provide a final metric location estimate for a given temporal point. The Kalman filter may be designed in any known manner.

Whether or not a non-linear loss function is used in the determination at operation 4200, determining operational environment information of a portion of the vehicle transportation network may occur at operation 4300. The operational environment information includes sensor data of a portion of the vehicle transportation network that is observable to the vehicle. For example, the portion may be defined by a sensor range of the vehicle, or by some other reasonable range about the vehicle when operational environment information is received from other than the vehicle sensors. One reason for limiting the scope of the operational environment information of the transportation network is that reasoning globally about all topological possibilities is computationally intractable due to a variable number of nodes. Further, for any fixed set of nodes the number of unique topologies is exponential in the number of nodes. Instead, the reasoning about location and structure within local, observable topology allows inference algorithms to handle a variable number of nodes as well as multiple topologies given a fixed set of nodes.

The sensor data of the operational environment information may be obtained using the sensors 1360, the sensor 2105, or some other sensor of the vehicle. The sensor data of the operational environment information may be obtained from transmissions of sensor data from one or more remote vehicles. The sensor data of the operational environment information may be obtained from any sensor within the vehicle transportation and communication system 2000. As one example, the sensor data comprises remote vehicle location data. Determining the vehicle operational information may comprise sensing or receiving a global position of one or more remote vehicles as the remote vehicle location data. Determining the vehicle operational information may comprise sensing or receiving a relative position of one or more remote vehicles as the remote vehicle location data. The relative position may be in the global coordinate system. Whether the global position or the relative position is available, it may be converted to the coordinate system of the topological map for determining the topological location estimate at operation 4400.

Lane line data may be available from the topological map for use in determining the topological location estimate. The lane line data may be converted into global coordinates. In some implementations, however, the sensor data comprises lane line data. That is, determining the vehicle operational information may comprise sensing or receiving data related to the lane lines of the road on which the vehicle is traveling.

At operation 4400, the process 4000 includes determining a topological location estimate of the vehicle within the vehicle transportation network using the metric location estimate and the operational environment information. An example of using operational environment information to determine a topological location estimate of the vehicle within the vehicle transportation network is shown in FIG. 6.

Figure 6:
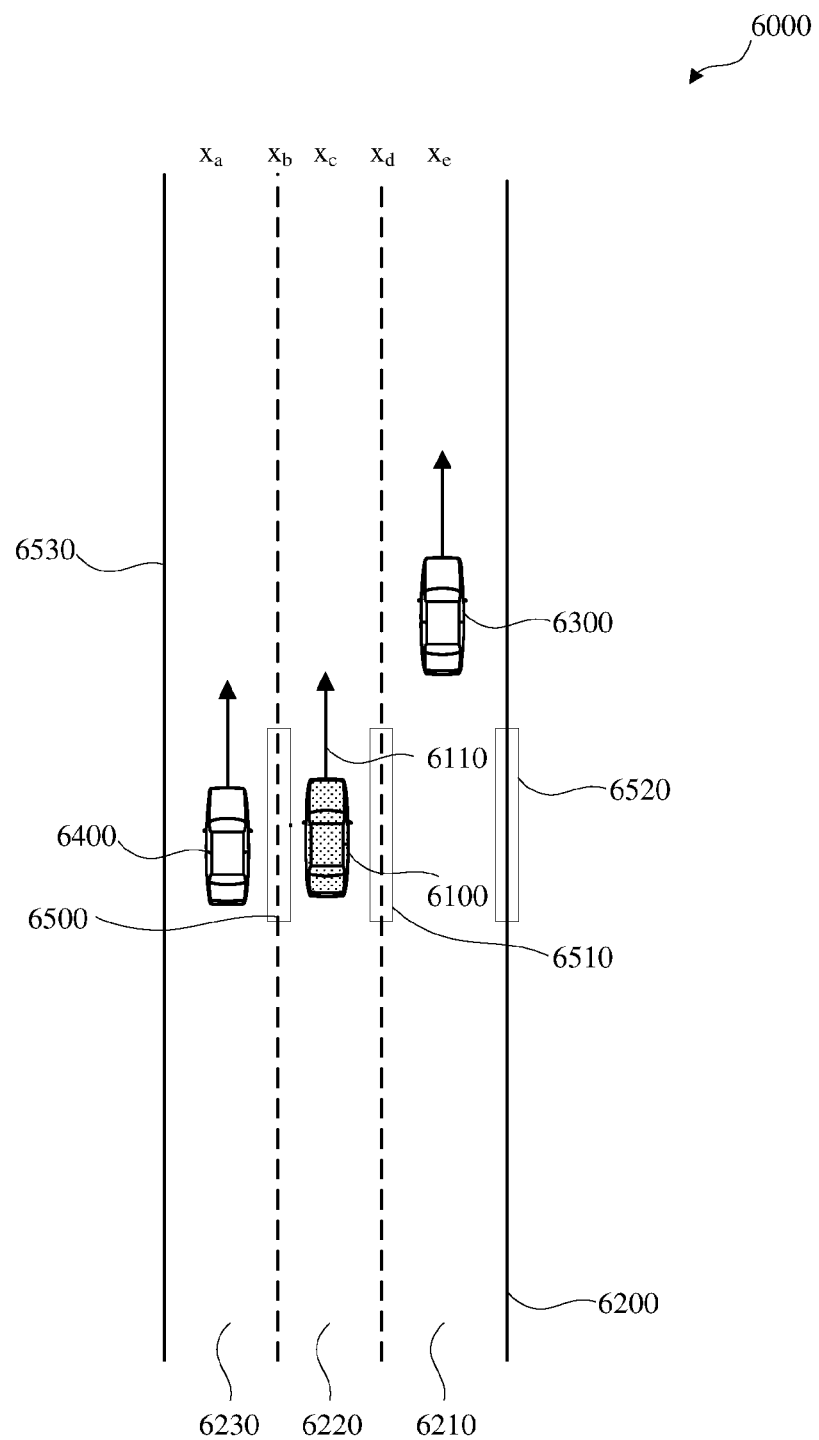
FIG. 6 is a diagram of an example of using operational environment information to determine a topological location estimate of the vehicle within the vehicle transportation network.

In the example of FIG. 6, local sensing is leveraged to determine the topological location estimate. The vehicle 6100 is traveling within a portion 6000 of the vehicle transportation network in a direction of travel indicated by the arrow 6110. The vehicle 6100 is indicated at the metric location estimate. The remote vehicle location data indicates the positions within the portion 6000 of the vehicle transportation network of the remote vehicle 6300 and the remote vehicle 6400. The lane line data includes lane lines 6500, 6510, and 6520. The lane line 6530 is not detected.

Determining the topological location estimate of the vehicle within the vehicle transportation network using the metric location estimate and the operational environment information at operation 4400 can include generating lane hypotheses for the vehicle using the lane line data and the remote vehicle location data, and determining the topological location estimate as whichever of the lane hypotheses is more likely based on the metric location estimate.

Generating the lane hypotheses can include defining multiple lanes of the portion of the vehicle transportation network using the lane line data and the remote vehicle location data, and generating the lane hypotheses based on a cardinality of the multiple lanes. The lane hypotheses may comprise at least two of a first lane hypothesis wherein the topological location estimate is a left lane of a multi-lane road, a second lane hypothesis wherein the topological location estimate is a center lane of the multi-lane road, or a third lane hypothesis wherein the topological location estimate is a right lane of the multi-lane road. In FIG. 6, for example, the lane line data (i.e., detected lane lines 6500, 6510, and 6520) indicates at least two lanes, the first lane 6210 of which is a right lane, and the other lane 6220 of which is a left lane or a center lane. The remote vehicle location data indicates that there are at least three lanes 6210, 6220, and 6230, such that lane 6220 is a center lane (and not a left lane).

Determining the topological location estimate as whichever of the lane hypotheses is more likely based on the metric location estimate can include comparing the metric location estimate to the operational environment information as represented by the lane hypotheses. In FIG. 6, for example, the lane line data together with the remote vehicle location data indicates that the identity of the lane 6220 in which the vehicle 6100 is traveling more likely to be a center lane than a left lane or a right lane.

In some embodiments, the remote vehicle location data may be filtered to remove data for any remote vehicle traveling in a direction different from the vehicle before determining the topological location estimate as whichever of the lane hypotheses is more likely based on the remote vehicle location data. Filtering the remote vehicle location data in such a way may also be done before generating the lane hypotheses. While not necessary, filtering reduces the scope of the operational environment information of the vehicle transportation network that is considered, reducing the complexity of the analysis.

The technique of leveraging local sensing described above that tracks the locations of remote vehicles can be valuable in differentiating between two otherwise ambiguous lane hypotheses (e.g., right lane versus center lane, or left lane versus center lane). Further, tracking other vehicle locations can provide the further benefit of identifying otherwise unmapped traffic patterns.

The discussion of FIG. 6 above relies, in part, on the assumption that the cardinality of lanes can be accurately determined using the lane line data and the remote vehicle location data. However, the absence of any of this data can reduce the accuracy of the determination. The sensors may not detect the data at all times. Further, more complicated topologies may result in the lane line data and the remote vehicle location data indicating that the vehicle is present in more than one lane. For these reasons, a more general approach to modeling lane membership may be used.

Modeling lane membership desirably calculates probabilities as a way to represent uncertainty, uses multiple sensor inputs, and models the physical constraints of the real world (e.g., the operational environment information). According to the teachings herein, determining the topological location estimate of the vehicle at operation 4400 may comprise determining a lane membership of the vehicle within a multi-lane road of the vehicle transportation network over a series of temporal points by modeling the lane membership of the vehicle using a Hidden Markov Model (HMM).

HMMs are useful when a distinct state of the system is unknown, but the state produces data that can be observed. From the observed data, probabilities regarding in which distinct state of at least two states the system exists can be determined. The highest probability is the most likely state of the system. Here, the unknown is the topological location estimate (e.g., the lane membership). Using one or more HMMs for topological localization (e.g., lane membership) supports many efficient modes of inference and learning, and HMMs may be easily designed for specific sensor features, specific topological structures, or both. According to the teachings herein, observation models for each sensor may be encoded in the observation probability, and the state transition matrix may encode the physical constraints of the real world. A solution of the HMM produces a probability distribution over lanes of the multi-lane road.

These concepts may be initially described with reference to FIG. 6. In FIG. 6, lane states $x_a$-$x_e$ are shown, as are observable features (i.e., the lane line data for lane lines 6500, 6510, and 6520, and remote vehicle location data for the remote vehicles 6300 and 6400). The lane hypotheses described previously may correspond to the lane states in an HMM, or to a subset of the lane states in an HMM. The lane states $x_a$-$x_e$ correspond to distinct topological positions on the road for which there are expected observations. For example, if the vehicle 6100 were in the right lane 6210 (i.e., state $X_e$), lane line data indicating the presence of two lanes to the left of the vehicle 6100 (here, lanes 6500 and 6510) would be an expected observation. As another example, an observation of a remote vehicle, such as the remote vehicle 6400 to the left of the vehicle 6100 is not an expected observation if the vehicle 6100 were in the left lane 6230 (i.e., state $X_a$), but is an expected observation if the vehicle 6100 were in the center lane 6220 (i.e., state $x_e$) or the right lane 6210 (i.e., state $X_e$). In FIG. 6, the lane state $x_e$ is the only state for the vehicle that is supported by both the lane line data and the remote vehicle location data. Lane line data alone would result in the equal belief in both states $x_e$ and $x_e$.

Stated more generally, topological location (here, the topological location estimate) may be modeled as occupancy of a state $x_i \in X$ within an HMM. In this discussion, the topological location estimate is directed to toward lane-level localization, but applications may be used for other levels of granularity such as road-level localization. Due to the lane-level localization, the states X in the HMM may correspond to either being in the center of a lane or being between two lanes. For example, an HMM representing a two lane road, detailed in FIG. 7, has three states $x_0$, $x_i$, and $x_2$. States $x_0$ and $x_2$ correspond to a vehicle occupying the right-most lane and the left-most lane, respectively. State $x_i$ represents having some portion of the vehicle on top of the lane divider. State $x_i$ may be considered a switching state. In practice, one extra state may be included that represents the set of locations whose observations are not explainable by any other state in the HMM. Thus, an HMM representing a road with a cardinality of L lanes has 2L states in some examples. In theory, there could be an arbitrary number of lanes and hence an arbitrary number of non-zero transition probabilities. Hence, the example of FIG. 7 is illustrative only and is not indicative of the HMM size in general.

Figure 7:
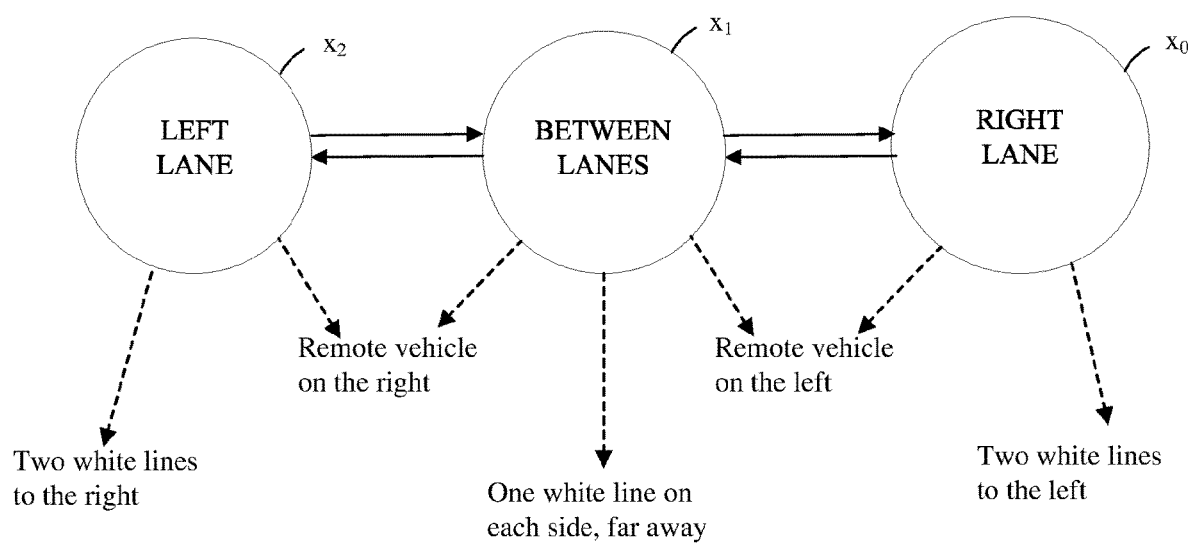
FIG. 7 is a diagram of an example of implementing a Hidden Markov Model for localization determination in accordance with embodiments of this disclosure.

In FIG. 7, the solid lines represent non-zero transition probabilities between states, while self-loops are omitted. The transition probabilities between states may also be referred to herein as state transition probabilities. More specifically, states of an HMM may comprise a left lane, a right lane, and a position between the left lane and the right lane (e.g., when a multi-lane road is a two-lane road), and the state transition probabilities of the HMM comprise a first probability that the lane membership of the vehicle will remain in the left lane from a current temporal point to a subsequent temporal point, a second probability that the lane membership of the vehicle will change from the left lane at the current temporal point to the position between the left lane and the right lane at the subsequent temporal point, a third probability that the lane membership of the vehicle will change from the position between the left lane and the right lane at the current temporal point to the left lane at the subsequent temporal point, a fourth probability that the lane membership of the vehicle will remain in the position between the left lane and the right lane from the current temporal point to the subsequent temporal point, a fifth probability that the lane membership of the vehicle will change from the position between the left lane and the right lane at the current temporal point to the right lane at the subsequent temporal point, a sixth probability that the lane membership of the vehicle will change from the right lane at the current temporal point to the position between the left lane and the right lane at the subsequent temporal point, and a seventh probability that the lane membership of the vehicle will remain in the position between the left lane and the right lane from a current temporal point to a subsequent temporal point.

In FIG. 7, dashed lines represent observation or emission probabilities, some of which are exclusive for a single state. The observation probabilities of the HMM may comprise respective probabilities of possible output values of sensor data for the states. For example, if there is a remote vehicle to the right of the host or target vehicle, an equal probability is assigned to each of states $x_2$ and $x_i$, while a probability of zero may be assigned to state $x_0$. As another example, if there is one white line detected on each side of the host or target vehicle, where the lines are relatively far away from sides of the vehicle (i.e., further than would be expected if the vehicle was traveling in the center of a lane), a probability of 1 (or 100%) may be assigned to state $x_i$, while a probability of zero may be assigned to each of states $x_0$ and $x_j$. As can be seen from these examples, observation models for each sensor are encoded in the observation probability for respective states. This is a simplified description of the determination of probabilities, as it assumes that the cardinality of lanes and their sizes are relatively constant. Other techniques may be used to assign the observation or emission probabilities to the states.

Regardless of the source of an observation (e.g., a sensed value), and whether the observation is used here or in any of the other implementations and variations for topological localization described herein, confidence measures may be used with the observations. That is a confidence measure may be assigned to each observation to weight that observations influence in any resulting probabilities. For example, confidence may be calculated for remote vehicle location information using criteria such as: 1) range relative to the vehicle, 2) duration of tracking and consistency of tracked attributes, 3) per-item separation given tracked speed, 4) absolute and relative velocity, and 5) relative heading. True positives exhibit characteristic values for the these quantities that are often violated by commonly occurring false positives.

Note that the transition structure of the HMM matches the topological structure of a two-lane road of the vehicle transportation network. That is, an HMM can be particularly desirable in topological localization due to its ability to accurately model real-world dynamics via its transition function. Because the vehicle can only move from the center of one lane to the center of an adjacent lane by moving through an immediately adjacent switching state, the state transition matrix representing the transition function is sparse. Generally, the state transition matrix $\tau^n$ for an n-state HMM may be defined as:

$$\tau^n = \begin{cases} t_r & \text{if } i = j \\ t_s & \text{if } |i - j| = 1 \\ 0 & \text{otherwise} \end{cases} \quad (1)$$

where $t_r$ is the parameter for the probability of remaining in the same state and t is the parameter for the probability of switching to an adjacent state. This definition reduces reports of physically impossible events, such as instantaneous changes across multiple lanes. This provides a distinct advantage over other multimodal approaches, such as particle filters.

As may be determined from the above description, in addition to GPS and proprioceptive sensors, such as a speed sensor, both lane line data and the relative locations of other vehicles may inform the topological location estimate. Instead of the simplified technique described above with regard to FIG. 6, for lane lines, a combination of learned parameters and information from the topological map may be used to parametrize a Gaussian Mixture Model that describes the likelihood of observing a lane line at some position and orientation relative to the vehicle given a particular lane state.

Lane line information may be intermittent due to occlusions, weather, time of day, and the absence of the markings themselves on many roads. To reduce the cycles during which there is no exteroceptive signal, the relative positions of nearby tracked vehicles support the vehicle presence in certain lane states. The rationale behind this innovation is that, although other vehicles (e.g., remote vehicles) move both globally and relatively, they do so according to a specific local pattern defined by lane membership. For example, if the (e.g., host) vehicle is on a two-lane road and senses a remote vehicle immediately to its right, then there is a high probability that the vehicle is in the left lane since the observed vehicle is far more likely to be traveling in the right lane than to be traveling beyond the edge of the road. The observation function for the state $x_t$ and a sensor q may be denoted as $\phi(x_t,q)$.

As mentioned above, a solution of the HMM produces a probability distribution over lanes of the multi-lane road, in this example a two-lane road. The most likely state is the determined topological location estimate at operation 4400. At operation 4500, the vehicle traverses the vehicle transportation network based on the topological location estimate. Traversing the vehicle transportation network at operation 4500 may be performed as previously described.

Although a single HMM is reliable for topological localization when the topological map is substantially correct and the number of states in the HMM matches the number true lane states, a single HMM can fail when the map does not supply the correct number of lanes due to map errors or temporary events. To address map uncertainty, a brute force approach of testing multiple HMMs is possible. However, this is a computationally complex solution. Instead, what is referred to as a Variable Structure Multiple Hidden Markov Model (VSM-HMM) herein may be incorporated.

The VSM-HMM may be defined as a set of all possible models U along with an active model set $U_A$ and an inactive model set $U_N$. Every $u \in U$ is an HMM with a unique state space. Accordingly, $U_A \cup U_N$, and $U_A \cap U_N = \emptyset$.

Figure 8:
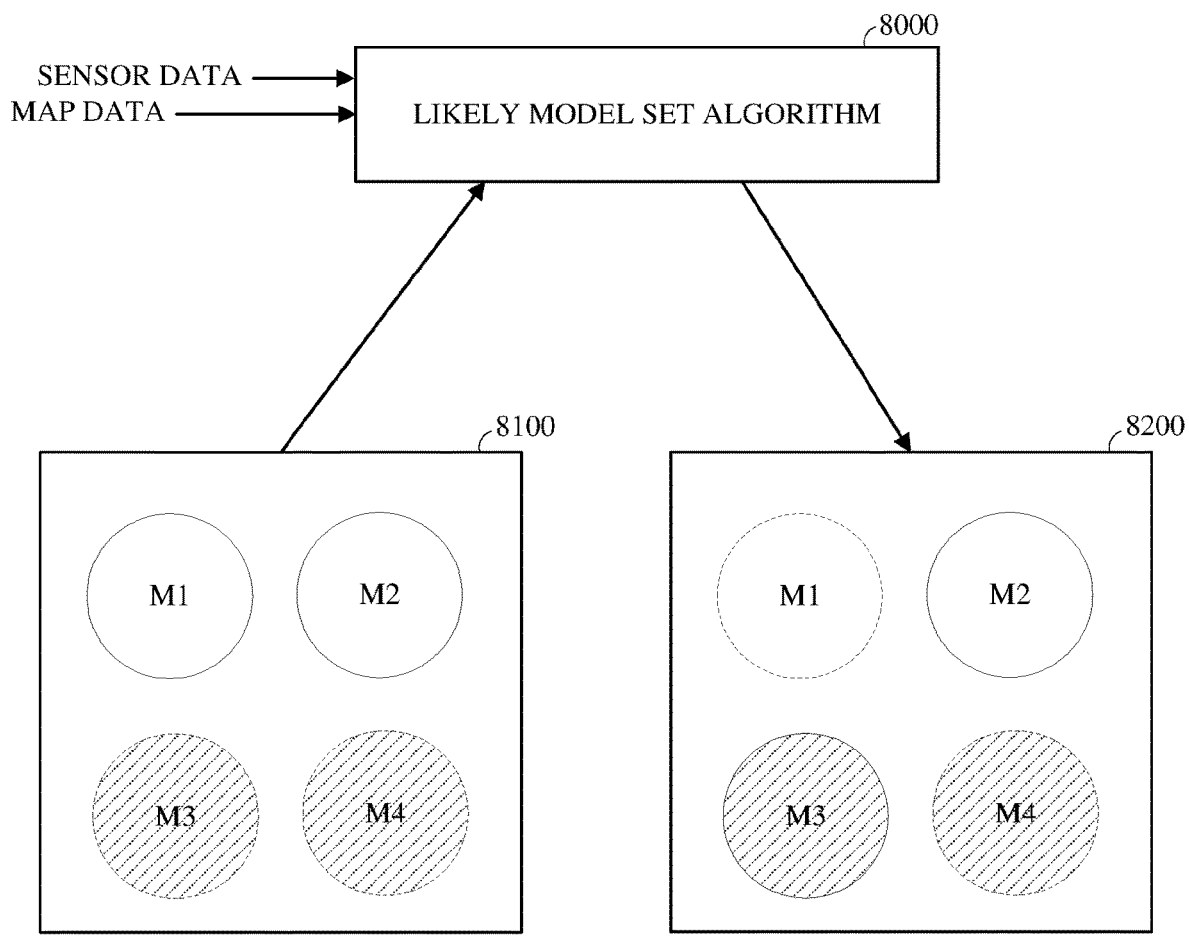
FIG. 8 is a diagram of an example of implementing Variable Structure Multiple Hidden Markov Models for location determination in accordance with embodiments of this disclosure.

The VSM-HMM may be described with reference to FIG. 8, where the set of all possible models U includes HMMs u, labeled M1, M2, M3, and M4. The model M1 may be, for example, the HMM of FIG. 7. Another of the models M2, M3, or M4 may be an HMM of a three-lane road. Other topologies may be modeled. In FIG. 8, the VSM-HMM at an initial iteration is shown as the VSM-HMM 8100, where models M1 and M2 form the active model set $U_A$, and models M3 and M4 form the inactive model set $U_N$.

At every iteration, the active model set $U_A$ may be determined using a variation of the Likely Model Set (LMS) algorithm 8000, as shown below in Algorithm 1, and model selection criteria. The updated active model set $U'_A$ and a likelihood score array S are initialized (lines 3-4). For every model within the set ($u \in U$), a likelihood score is calculated (line 6). The likelihood score depends upon the probability Pr(u|M) that the model u matches the topological map (map data in FIG. 8) and the probability that the model u matches the observations z (sensor data in FIG. 8, also referred to as the operational environment information determined at operation 4300). Models are then sorted in descending order by their score (line 8), and subsequent models are chosen for inclusion in the updated active model set U so long as the ratio between their score $s_o$ and the maximum score $s_{max}$ is above a threshold $T_{active}$ (lines 10-15). The number of models selected as active models in the updated active model set $U'_A$ (referred to below as models u') is lower bounded by one (line 12), and upper bounded by a constant K (line 14). The constant K may depend on the computational constraints expected during vehicle operation. Finally, belief is copied from models that are already active, and belief is initialized for models that are not already active are not (lines 16-20). As used here, belief corresponds to a solution (e.g., to the entire probability distribution) unless otherwise clear from context.

---

Algorithm 1 LIKELY MODEL SELECTION

1: Input: All models U, active models $U_A$, observations z,
   max number of models κ, threshold $T_{active}$, map M
2: Output: Set of updated most likely models $U_A'$
3: $U_A' \leftarrow \emptyset$
4: $S \leftarrow [\ ]$
5: for all $u \in U$ do
6:   $s \leftarrow \Pr(u|M) \times \Pr(u|z)$
7:   $S \leftarrow S.\text{APPEND}(s,u)$
8: $S \leftarrow \text{SORTREVERSEONS}(S)$
9: $s_{max} \leftarrow s_0$
10: for all s, $u \in S$ do
11:   if $|U_A| = 0$ then
12:     $U_A' \leftarrow U_A' \cup u_0$
13:   else 14:   $\quad$ if $|U_A| < \kappa$ and $\dfrac{s}{s_{max}} > T_{active}$ then 15:     $U_A' \leftarrow U_A' \cup u$
16:   for all $u' \in U_A'$ do
17:     if $u' \in U_A$ then
18:       $u' \leftarrow \text{COPYEXISTINGBELIEF}(u')$
19:     else
20:       $u' \leftarrow \text{INITNEWBELIEF}(u')$
   return $U_A'$

---

The output of the LMS algorithm 8000 is the updated active model set $U'_A$. In the example of FIG. 8, the models M2 and M4 do not change their status. The model M1 is de-activated, and the model M3 is activated. Accordingly, models M2 and M3 form the active model set $U_A$, and models M1 and M4 form the inactive model set $U_N$ for the VSM-HMM 8200.

Discrepancies between the topological map M and the actual topology may be detected by comparing the entropy H(u) of belief distributions Pr(u) for each active model (i.e., each model u in the active model set $U_A$). If the model suggested by the map M has a high entropy compared to another model, the map M is likely incorrect. High entropy generally indicates that no state in the suggested topology can explain the observations z. According to an example, entropy H(u) may be calculated using the Shannon entropy equation.

Algorithm 2 outlines the procedure for checking the map M against observations z. The value for the threshold $T_{ent}$ is set based on the reliability of the map M. The more reliable the map M, the higher the value of the threshold $T_{ent}$.

---
Algorithm 2 ENTROPY FILTER
---

1: Input: Active models $U_A$, threshold $T_{ent}$, map M
2: Ouput: Map discrepancy indicator, Error
3: $u_{map}$ ← SUGGESTEDMODELFROMMAP(M)
4: $e_{map}$ ← H ($u_{map}$)
5: E ← ∅
6: for all u ∈ $U_A$ \ $u_{map}$ do
7:    E ← E ∪ H(u)
8: if max(E) > $T_{ent} e_{map}$ then
9:    Error ← true
10: else
11:   Error ← false

---

When the set of active models is equal to the total set of models ($U_A$=U), the VSM-HMM is equivalent to one, large HMM with a dense transition matrix $\tau^*$. The transition matrix $\tau^*$ may be defined in terms of the sub-blocks representing each distinct topological hypothesis $\tau 2, \tau 4, \ldots, \tau n$, and the transitions between them.

According to such a technique, each sub-block $\tau \kappa$ may be arranged on the diagonal of the transition matrix $\tau^*$. Further, the off-diagonal blocks may be completely dense and have the value $t_m$, the probability of switching models. Thus, $$\tau^*_{ij} = \begin{cases} \tau^k_{lm} & \text{if } i, j \text{ index } l, m \text{ in sub-block } k \\ t_m & \text{otherwise} \end{cases} \quad (2)$$

In general, this results in a p×p transition matrix, where $p = \Sigma_{X \in U} |X^i|$. Similarly, $X^*$ and $\phi^*$ are defined by the union of all state spaces and observation functions, respectively.

When $U_A \subset U$, then the VSM-HMM is approximating the equivalent HMM by reasoning over a subset of the most likely beliefs.

The solution to the VSM-HMM is a probability distribution over lanes of the different possible topologies for the current road. The most likely state is the determined topological location estimate at operation 4400. At operation 4500, the vehicle traverses the vehicle transportation network based on the topological location estimate. Traversing the vehicle transportation network at operation 4500 may be performed as previously described.

Use of the VSM-HMM described herein estimates the current structure of the local topology. That is, the VSM-HMM hypothesizes about the outside world state. This is useful when the local topological map has non-zero uncertainty (i.e., that there is some uncertainty in the topological map). It allows parallel reasoning about multiple possible topologies. Further, it does not require additional observations other than those already available for determining the topological location estimate using an HMM, and knowledge (e.g., regarding the HMMs) is reused whenever possible.

Whether a single HMM or a VSM-HMM is used in the determination of the topological location estimate, belief transfer is an issue. Belief transfer may be explained by considering a vehicle has a belief about its current topological position in a known, local topology. This belief is discrete and lies on the n-simplex $\Delta^n$, where n is the number of local topological states and which in this example roughly correspond to the number of lanes on the road the vehicle is traveling. Where the vehicle is nearing an intersection or a merge, the number of lanes on the road the vehicle will end up on may be different than the current number of lanes. Thus the current belief distribution lies in a different space $\Delta^n$ than the impending belief distribution, which lies in $\Delta^m$. The impending belief cannot simply be copied from the current belief.

One option is to erase all previous beliefs upon entering a new road and start over from some probability distribution, such as a uniform distribution. Another option is to heuristically decide how to initialize the new belief. Both options are computationally efficient, but do not perform optimally in many cases. A third option is to find the closest expected distribution in $\Delta^m$ to the current distribution in $\Delta^n$, where closeness is defined by some statistical metric. This may be preferable to the other options, but it is complicated by the lack of isomorphism between $\Delta^n$ and $\Delta^m$. The solution herein describes a variation of the first Wasserstein distance, also called the Earth Mover's Distance, which is referred to herein as the Extended Earth Mover's Distance (EEMD). The EEMD defines the similarity between discrete distributions on simplices of arbitrary relative sizes, and handles mappings with arbitrary degrees of uncertainty.

How to implement the EEMD is next described, where $\mathbb{P}^n$ and $\mathbb{P}^m$ are normalized distributions on $\Delta^n$ and $\Delta^m$, respectively. Without loss of generality, it is assumed for this example that n>m. The function f: $\Delta^m \rightarrow \Delta^n$ is defined as $$f_j(\mathbb{P}^m) = \begin{cases} \mathbb{P}^m_j & \text{if } j \leq m \\ 0 & \text{if } j > m \end{cases} \quad (3)$$

Thus, f essentially pads $\mathbb{P}^m$ with zero belief so as to make it the same size as $\mathbb{P}^n$. This new distribution, now in n dimensions, may be referred to as $\mathbb{P}^{m'}$. The conventional formulation of the Earth Mover's Distance (EMD) metric may be used to compute the distance between $\mathbb{P}^{m'}$ and $\mathbb{P}^n$.

However, in general, there may be uncertainty in the mapping between the two distributions. Thus, it may be the case that in reality $\mathbb{P}^{m'}$ and $\mathbb{P}^n$ do not correspond to the same real world state. One concrete example is a two-lane road that becomes a three-lane road across an intersection. This is shown by example in FIG. 9. It is unclear whether the two lanes in the first road to the left in FIG. 9 correspond to the two rightmost, two leftmost, or some other combination of lanes in the following three-lane road shown to the right in FIG. 9. Because the mapping may not be injective or surjective, there are $n^n$ possible mappings from $\mathbb{P}^{m'}$ and $\mathbb{P}^n$. To get the expected distance, a sum over all unique possibilities for $\mathbb{P}^{m'}$ may be calculated, and the EMD may be computed weighted by the probability of each mapping. Thus, the EEMD between $\mathbb{P}^{m'}$ and $\mathbb{P}^n$ may be defined as $$EEMD(\mathbb{P}^n, \mathbb{P}^m) = \Sigma_{i=1}^{n^n} Pr(\mathbb{P}^{m'_i}) EMD(\mathbb{P}^n, \mathbb{P}^{m'_i}) \quad (4)$$

It is assumed that $Pr(\mathbb{P}^{m'_i})$ is known and normalized across all i. This may be calculated using information from the map M. In practice, most of the summands may be ignored because the corresponding $Pr(\mathbb{P}^{m'_i})$ term is 0.

The EEMD is a metric, satisfying the properties of non-negativity, identity, and symmetry. For example, the EMD is always positive because it is a metric. $Pr(\mathbb{P}^{m'_i})$ is always non-negative. Their product is always non-negative, and the sum of non-negative elements is also non-negative. Thus, EEMD is always non-negative.

Identity is satisfied because $EEMD(\mathbb{P}^n, \mathbb{P}^m) = 0 \Rightarrow \mathbb{P}^n = \mathbb{P}^m$. More specifically, if $EEMD(\mathbb{P}^n, \mathbb{P}^m) = 0$, then for all summands, either $Pr(\mathbb{P}^{m'_i}) = 0$ and/or $EMD(\mathbb{P}^n, \mathbb{P}^{m'_i}) = 0$. Because $Pr(\mathbb{P}^{m'_i})$ is a distribution, there must be at least one i such that $Pr(\mathbb{P}^{m'_i}) > 0$. If there are more than one such i, then $EEMD(\mathbb{P}^n, \mathbb{P}^m)$ cannot be zero, because each $\mathbb{P}^{m'_i}$ is unique, and EMD is a metric. However, the assumption that $EEMD(\mathbb{P}^n, \mathbb{P}^m) = 0$ is violated. If there is a single i such that $Pr(\mathbb{P}^{m'_i}) > 0$, then because EMD is a metric and must be zero, $EEMD(\mathbb{P}^n, \mathbb{P}^m) = 0 \Rightarrow EMD(\mathbb{P}^n, \mathbb{P}^{m'_i}) = 0 \Rightarrow \mathbb{P}^n = \mathbb{P}^m$. Further, $\mathbb{P}^n = \mathbb{P}^m \Rightarrow EEMD(\mathbb{P}^n, \mathbb{P}^m) = 0$, which is clear from the definition of EEMD and $Pr(\mathbb{P}^{m'_i})$. All $Pr(\mathbb{P}^{m'_i})$ will be zero except when $\mathbb{P}^{m'_i} = \mathbb{P}^m$. For this term, the corresponding EMD will be zero since EMD is a metric.

Finally, the smaller dimension of the two distributions is always augmented, regardless of order. Thus, the exact same calculation is performed for both $EEMD(\mathbb{P}^n, \mathbb{P}^m)$ and $EEMD(\mathbb{P}^n, \mathbb{P}^m)$. So, $EEMD(\mathbb{P}^n, \mathbb{P}^m) = EEMD(\mathbb{P}^n, \mathbb{P}^m)$, satisfying the property of symmetry.

Figure 9:
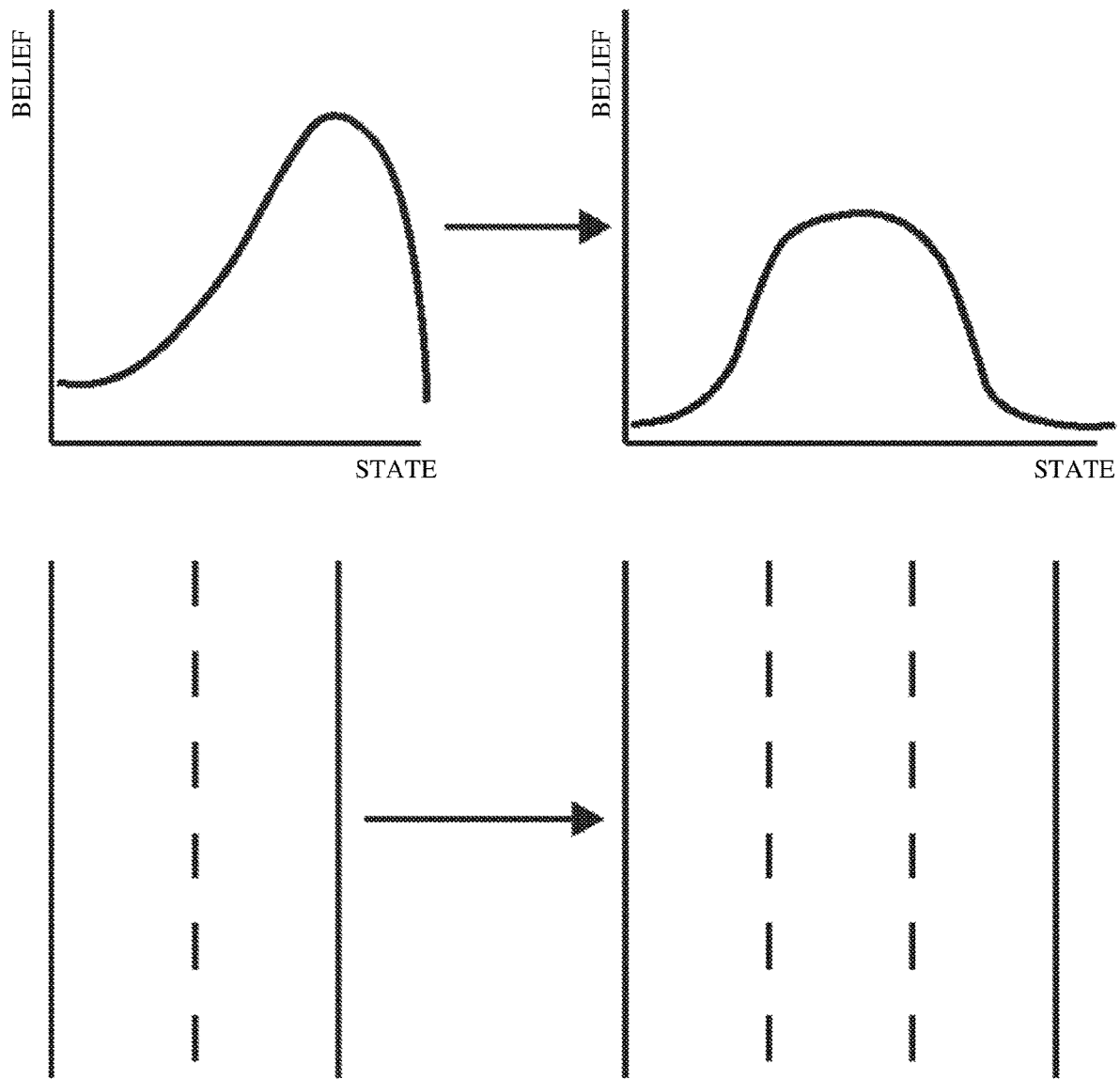
FIG. 9 is a diagram of an example of implementing an Extended Earth Mover's Distance metric for location determination in accordance with embodiments of this disclosure.

FIG. 9 shows the belief transfer from the two-lane road to the new, three-lane road. As mentioned above, there is no clear mapping from the two-lane road to the three-lane road, so it is ambiguous how to estimate the belief on the middle lane. However, given the belief over all lanes for the two lane road, e.g., Pr(two-lane road HMM), then $EEMD(\mathbb{P}^n, \mathbb{P}^m)$ produces a value for the belief of all states of the three-lane road, while explicitly taking into account the mapping ambiguity and uncertainty described above.

The EEMD allows mapping between domains of different sizes, and can be approximated efficiently when there is uncertainty in the mapping. The EEMD is applicable to any two distributions on discrete domains.

Each of the solutions presented herein is an improvement over current techniques for vehicle localization. As explained above, separately or together, they address uncertainty, ambiguity, native errors, or a combination of these issues with regard to sensors, maps, or both.

Further implementations are summarized in the following examples:

Example 1

A method of traversing a vehicle transportation network, the method comprising: traversing, by a vehicle, a vehicle transportation network, wherein traversing the vehicle transportation network includes: determining vehicle operational information comprising a longitude and a latitude of the vehicle measured at multiple temporal points while the vehicle is traversing the vehicle transportation network; determining a metric location estimate of the vehicle using the vehicle operational information comprising: determining a location estimate for respective temporal points of the multiple temporal points; determining a projected location estimate for respective, subsequent temporal points; and determining the metric location estimate of a current temporal point using a non-linear loss function with a Kalman filter to mitigate effects of un-modeled sensor error, the non-linear loss function based on a comparison of the location estimate with the projected location estimate for a same temporal point; determining a topological location estimate of the vehicle within the vehicle transportation network using the metric location estimate; and traversing the vehicle transportation network based on the topological location estimate of the vehicle.

Example 2

The method of example 1, wherein determining the projected location estimate comprises: determining the projected location estimate for a second temporal point subsequent to a first temporal point using a heading of the vehicle measured at the first temporal point.

Example 3

The method of example 1 or example 2, further comprising: determining operational environment information of a portion of the vehicle transportation network, the operational environment information including sensor data within a portion of the vehicle transportation network defined by a sensor range of the vehicle, wherein determining the topological location estimate comprises: determining the topological location estimate of the vehicle within the vehicle transportation network using the metric location estimate and the operational environment information.

Example 4

The method of any of examples 1 to 3, wherein the non-linear loss function comprises multiple radii defining concentric circles about a first projected location estimate at a current temporal point, the non-linear loss function: providing sensed values of the longitude and the latitude at the current temporal point to the Kalman filter, for determining the metric location estimate of the current temporal point, responsive to the location estimate for the current temporal point being located within a first circle having a smallest radius of the multiple radii; omitting the sensed values from the Kalman filter, for determining the metric location estimate of the current temporal point, responsive to the location estimate for the current temporal point being located outside of a second circle having a largest radius of the multiple radii; and applying a penalty to the sensed values to obtain penalized sensed values, and providing the penalized sensed values to the Kalman filter, for determining the location estimate of the current temporal point, responsive to the metric location estimate for the current temporal point being located outside of the first circle and inside of the second circle.

Example 5

The method of any of examples 1 to 4, wherein the non-linear loss function is a context-based function.

Example 6

The method of example 5, wherein a context of the context-based function is operational environment information of the portion of the vehicle transportation system

Example 7

The method of example 6, wherein the operational environment information is one of a city environment or a country environment.

Example 8

The method of any of examples 1 to 7, wherein the non-linear loss function varies a weight applied to at least one measured value of the vehicle operational information input into the Kalman filter based on a distance of the location estimate from the projected location estimate for the same temporal point.

Example 9

A vehicle that performs any of the methods of examples 1-8.

Example 10

A non-transitory storage medium storing instructions that cause a processor to perform any of the methods of examples 1-8.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of traversing a vehicle transportation network, the method comprising:
   determining vehicle operational information of a vehicle, including sensing a position of the vehicle in a global coordinate system, wherein the vehicle is an autonomous vehicle or a semi-autonomous vehicle;
   determining a metric location estimate of the vehicle using the vehicle operational information, including determining the metric location estimate using the sensed position as input to a non-linear loss function with a Kalman filter to mitigate effects of un-modeled sensor error, wherein the metric location estimate is an output of the Kalman filter;
   determining operational environment information of a portion of the vehicle transportation network, the operational environment information including sensor data of a portion of the vehicle transportation network that is observable to the vehicle;
   determining a topological location estimate of the vehicle within the vehicle transportation network using the metric location estimate and the operational environment information, wherein the topological location estimate includes a lane membership of the vehicle within the vehicle transportation network; and
   traversing, by the vehicle, the vehicle transportation network using the topological location estimate of the vehicle as input to perform a vehicle operation.

2. The method of claim 1, wherein the operational environment information comprises lane line data.

3. The method of claim 2, wherein the operational environment information comprises remote vehicle location data, and determining the topological location estimate of the vehicle within the vehicle transportation network using the metric location estimate and the operational environment information comprises:

generating lane hypotheses for the vehicle using the lane line data and the remote vehicle location data; and
determining the topological location estimate as whichever of the lane hypotheses is more likely based on the metric location estimate.

4. The method of claim 3, wherein generating the lane hypotheses for the vehicle using the lane line data and the remote vehicle location data comprises:
defining multiple lanes of the portion of the vehicle transportation network using the lane line data and the remote vehicle location data; and
generating the lane hypotheses based on a cardinality of the multiple lanes, the lane hypotheses comprising at least two of a first lane hypothesis wherein the topological location estimate is a left lane of a multi-lane road, a second lane hypothesis wherein the topological location estimate is a center lane of the multi-lane road, or a third lane hypothesis wherein the topological location estimate is a right lane of the multi-lane road.

5. The method of claim 3, further comprising:
removing, from the remote vehicle location data data for any remote vehicle traveling in a direction different from the vehicle before determining the topological location estimate as whichever of the lane hypotheses is more likely based on the remote vehicle location data.

6. The method of claim 1, wherein the operational environment information comprises remote vehicle location data, and the remote vehicle location data comprises a relative location of one or more remote vehicles to the vehicle.

7. The method of claim 1, wherein the lane membership comprises a lane within a multi-lane road of the vehicle transportation network.

8. The method of claim 1, wherein determining the topological location estimate of the vehicle comprises determining the lane membership within a multi-lane road of the vehicle transportation network over a series of temporal points by:
modeling the multi-lane road using a Hidden Markov Model (HMM), a solution of the HMM producing a probability distribution over lanes of the multi-lane road.

9. The method of claim 8, wherein
states of the HMM comprise a left lane, a right lane, and a position between the left lane and the right lane,
state transition probabilities of the HMM comprise:
a first probability that the lane membership of the vehicle will remain in the left lane from a current temporal point to a subsequent temporal point;
a second probability that the lane membership of the vehicle will change from the left lane at the current temporal point to the position between the left lane and the right lane at the subsequent temporal point;
a third probability that the lane membership of the vehicle will change from the position between the left lane and the right lane at the current temporal point to the left lane at the subsequent temporal point;
a fourth probability that the lane membership of the vehicle will remain in the position between the left lane and the right lane from the current temporal point to the subsequent temporal point;
a fifth probability that the lane membership of the vehicle will change from the position between the left lane and the right lane at the current temporal point to the right lane at the subsequent temporal point;
a sixth probability that the lane membership of the vehicle will change from the right lane at the current temporal point to the position between the left lane and the right lane at the subsequent temporal point; and
a seventh probability that the lane membership of the vehicle will remain in the position between the left lane and the right lane from a current temporal point to a subsequent temporal point, and
observation probabilities of the HMM comprise respective probabilities of possible output values of the sensor data for the states.

10. The method of claim 8, wherein a highest probability value of the probability distribution indicates the lane membership of the vehicle.

11. The method of claim 8, wherein determining the lane membership comprises:
using the HMM within a Variable Structure Multiple Hidden Markov Model comprising multiple HMMs, each of the multiple HMMs modeling a respective possible topology for the lanes of the multi-lane road.

12. The method of claim 8, wherein a cardinality of the lanes of the multi-lane road changes from a first temporal point to a second temporal point of the series of temporal points, and
determining the lane membership of the vehicle within the multi-lane road of the vehicle transportation network at the second temporal point comprises:
mapping the probability distribution over the lanes of the multi-lane road produced using the HMM at the first temporal point to an updated probability distribution over the lanes of the multi-lane road at the second temporal point.

13. The method of claim 12, wherein mapping the probability distribution comprises:
mapping the probability distribution using an Earth Mover's Distance (EMD) metric.

14. The method of claim 1, wherein:
sensing the position of the vehicle comprises sensing a global position using a global positioning system (GPS) sensor, and
determining the metric location estimate of the vehicle within the vehicle transportation network comprises:
using the sensed global position as the input to the non-linear loss function,
wherein the non-linear loss function weights sensed values of the GPS sensor; and
using an output of the non-linear loss function within the Kalman filter, wherein the Kalman filter outputs the metric location estimate.

15. An autonomous or semi-autonomous vehicle comprising:
a processor configured to execute instructions stored on a non-transitory computer readable medium to:
determine vehicle operational information of the vehicle, including sensing a position of the vehicle in a global coordinate system;
determine a metric location estimate of the vehicle using the vehicle operational information, including determining the metric location estimate using the sensed position as input to a non-linear loss function with a Kalman filter to mitigate effects of un-modeled sensor error, wherein the metric location estimate is an output of the Kalman filter;

determine operational environment information of a portion of a vehicle transportation network, the operational environment information including sensor data of a portion of the vehicle transportation network that is observable to the vehicle;

determine a topological location estimate of the vehicle within the vehicle transportation network using the metric location estimate and the operational environment information, wherein the topological location estimate includes a lane membership of the vehicle within the vehicle transportation network; and traverse, by the vehicle, the vehicle transportation network based on the topological location estimate of the vehicle as input to perform a vehicle operation.

16. The vehicle of claim 15, wherein the processor is configured to execute the instructions stored on the non-transitory computer readable medium to determine the topological location estimate by:

modeling a multi-lane road using a Hidden Markov Model (HMM), comprising:
identifying a plurality of states of the HMM corresponding to a topology of the multi-lane road;
identifying a plurality of state transition probabilities, wherein each state transition probability from the plurality of state transition probabilities represents a probability of transitioning from a first respective state from the plurality of states to a second respective state from the plurality of states;
identify a plurality of observations, each observation from the plurality of observations corresponding to a value of the operational environment information; and
identify a plurality of observation probabilities, wherein each observation probability from the plurality of observation probabilities indicates a probability of accuracy for a respective observation from the plurality of observations in association with a respective one or more states from the plurality of states.

17. The vehicle of claim 16, wherein the processor is configured to execute the instructions stored on the non-transitory computer readable medium to determine the topological location estimate by:

solving the HMM to produce a probability distribution over lanes of the multi-lane road; and
determining the topological location estimate as a lane of the multi-lane road having a highest probability value of the probability distribution.

18. The vehicle of claim 15, wherein the processor is configured to execute the instructions stored on the non-transitory computer readable medium to:

determine the vehicle operational information by determining a longitude and a latitude of the vehicle from the sensed position at multiple temporal points while the vehicle is traversing the vehicle transportation network;
determine the metric location estimate by:
determining a location estimate for respective temporal points of the multiple temporal points;
determining a projected location estimate for respective, subsequent temporal points; and
determining the metric location estimate of a current temporal point using the non-linear loss function with the Kalman filter to mitigate the effects of un-modeled sensor error, the non-linear loss function based on a comparison of the location estimate with the projected location estimate for a same temporal point.

19. The vehicle of claim 18, further comprising:
a global positioning system sensor.

20. An autonomous or semi-autonomous vehicle, comprising:
a processor configured to execute instructions stored on a non-transitory computer readable medium to:
determine vehicle operational information of the vehicle, including sensing a position of the vehicle in a global coordinate system;
determine a metric location estimate of the vehicle using the vehicle operational information, including determining the metric location estimate using the sensed position as input to a non-linear loss function with a Kalman filter to mitigate effects of un-modeled sensor error, wherein the metric location estimate is an output of the Kalman filter;
determine operational environment information of a portion of a vehicle transportation network, the operational environment information including sensor data of a portion of the vehicle transportation network that is observable to the vehicle;
determine a topological location estimate of the vehicle within the vehicle transportation network using the metric location estimate and the operational environment information, wherein the topological location estimate includes a lane membership of the vehicle within the vehicle transportation network; and
traverse, by the vehicle, the vehicle transportation network based on the topological location estimate of the vehicle as input to perform a vehicle operation,
wherein the processor is configured to execute the instructions stored on the non-transitory computer readable medium to:
determine the vehicle operational information by determining a longitude and a latitude of the vehicle from the sensed position at multiple temporal points while the vehicle is traversing the vehicle transportation network;
determine the metric location estimate by:
determining a location estimate for respective temporal points of the multiple temporal points;
determining a projected location estimate for respective, subsequent temporal points; and
determining the metric location estimate of a current temporal point using the non-linear loss function with the Kalman filter to mitigate the effects of un-modeled sensor error, the non-linear loss function based on a comparison of the location estimate with the projected location estimate for a same temporal point; and
wherein the non-linear loss function comprises multiple radii defining concentric circles about a first projected location estimate at a current temporal point, the non-linear loss function:
providing sensed values of the longitude and the latitude at the current temporal point to the Kalman filter, for determining the metric location estimate of the current temporal point, responsive to the location estimate for the current temporal point being located within a first circle having a smallest radius of the multiple radii;
omitting the sensed values from the Kalman filter, for determining the metric location estimate of the current temporal point, responsive to the location estimate for the current temporal point being located outside of a second circle having a largest radius of the multiple radii; and applying a penalty to the sensed values to obtain penalized sensed values, and providing the penalized sensed values to the Kalman filter, for determining the location estimate of the current temporal point, responsive to the metric location estimate for the current temporal point being located outside of the first circle and inside of the second circle.

* * * * *